US012698411B2

(12) United States Patent
Brusch et al.

(10) Patent No.: US 12,698,411 B2
(45) Date of Patent: Aug. 4, 2026

(54) WATER SOLUBLE OR DISPERSIBLE COMPOSITION

(71) Applicant: HERCULES LLC, Wilmington, DE (US)

(72) Inventors: Kelly Anne Brusch, Newark, DE (US); Venkataram Krishnan, Avondale, PA (US); Grzegorz Stoklosa, Sewell, NJ (US); Zeena Kottukapally Cherian, Exton, PA (US)

(73) Assignee: HERCULES LLC, Wilmington, DE (US)

( * ) Notice: Subject to any disclaimer, the term of this patent is extended or adjusted under 35 U.S.C. 154(b) by 0 days.

(21) Appl. No.: 18/242,390

(22) Filed: Sep. 5, 2023

(65) Prior Publication Data

US 2023/0416558 A1 Dec. 28, 2023

Related U.S. Application Data

(62) Division of application No. 17/261,800, filed as application No. PCT/US2019/042662 on Jul. 19, 2019, now abandoned.

(60) Provisional application No. 62/701,158, filed on Jul. 20, 2018.

(51) Int. Cl.
| | |
|---|---|
| *C09D 171/02* | (2006.01) |
| *C08G 18/48* | (2006.01) |
| *C08G 65/329* | (2006.01) |
| *C09D 5/14* | (2006.01) |
| *C09D 7/42* | (2018.01) |
| *C09D 7/43* | (2018.01) |
| *C09D 7/45* | (2018.01) |
| *C09D 7/61* | (2018.01) |

(52) U.S. Cl.
CPC .......... *C09D 171/02* (2013.01); *C08G 18/48* (2013.01); *C08G 18/4833* (2013.01); *C08G 65/329* (2013.01); *C09D 5/14* (2013.01); *C09D 7/42* (2018.01); *C09D 7/43* (2018.01); *C09D 7/45* (2018.01); *C09D 7/61* (2018.01)

(58) Field of Classification Search
CPC ........................... C08G 18/48; C08G 18/4833
See application file for complete search history.

(56) References Cited

U.S. PATENT DOCUMENTS

| | | | |
|---|---|---|---|
| 2,588,771 A | | 3/1952 | Schwartz |
| 2,824,850 A | | 2/1958 | Widmer et al. |
| 2,921,037 A | | 1/1960 | Andres et al. |
| 3,016,362 A | | 1/1962 | Wismer |
| 3,959,391 A | | 5/1976 | Allain |
| 5,098,966 A | | 3/1992 | Scholten et al. |
| 5,574,127 A | * | 11/1996 | Sau ..................... C08G 65/332 |
| | | | 528/125 |
| 5,614,604 A | | 3/1997 | Krafcik |
| 6,369,132 B2 | | 4/2002 | Sau |
| 7,847,049 B2 | | 12/2010 | Ito et al. |
| 7,887,789 B2 | | 2/2011 | Harris et al. |
| 8,691,052 B2 | | 4/2014 | Zhang et al. |
| 2002/0052441 A1 | | 5/2002 | Burdick et al. |
| 2003/0161791 A1 | | 8/2003 | Bentley et al. |
| 2004/0060473 A1 | | 4/2004 | Bauer et al. |
| 2005/0150418 A1 | | 7/2005 | Bakeev et al. |
| 2006/0135586 A1 | | 6/2006 | Kozlowski et al. |
| 2010/0324177 A1 | | 12/2010 | Bakeev et al. |
| 2013/0030091 A1 | | 1/2013 | Bhargava et al. |
| 2015/0038422 A1 | | 2/2015 | Bossard et al. |
| 2017/0073468 A1 | | 3/2017 | McManus et al. |

FOREIGN PATENT DOCUMENTS

| | | | | |
|---|---|---|---|---|
| CN | 102532474 A | 7/2012 | | |
| CN | 103068868 A | 4/2013 | | |
| CN | 109844039 A | 6/2019 | | |
| CN | 112654562 A | 4/2021 | | |
| DE | 4327494 A1 | 2/1995 | | |
| EP | 979850 A1 | * 2/2000 | ............... | B05D 1/02 |
| EP | 2444432 B1 | 2/2013 | | |
| EP | 1541643 B1 | 3/2013 | | |
| EP | 2166043 B1 | 4/2016 | | |
| EP | 2044263 B1 | 9/2016 | | |
| WO | WO-2004011525 A1 | 2/2004 | | |
| WO | WO2013016612 A1 | 1/2013 | | |
| WO | WO2020047047 A1 | 3/2020 | | |

OTHER PUBLICATIONS

References cited in the International Search Report of International Application No. PCT/US19/42662.

E. Alami et al. Aggregation of Hydrophobically End-Capped Poly-(ethylene oxide) in Aqueous Solutions. Fluorescence and Light-Scattering Studies Department of Physical Chemistry, University of Uppsala, Macromolecules 1996, 29, 2229-2243.

"E. Alami et al. Model Hydrophobically End-Capped Poly(ethylene oxide) in Water Institut Charles Sadron Centre National de la Recherche Scientificque—Universitè Louis Pastuer Chapter DOI; 10.1021/ba-1996-0248.cho18; Hydrophilic Polymers; Chapter 18, pp. 343-362; Advances in Chemistry, vol. 248".

"JeanneFraçis et al Association in water of model hydrophobically end-capped poly(ethylene oxide) Institut Charles Sadron, Universitè Louis Pasteur, 6 rue Boussignaul Progress in Organic Coatings vol. 24, Issues 1-4, Jun.-Sep. 1994, pp. 67-79".

E. Alami et al. Aggregation of Hydrophobically End-Capped Poly9ethylene oxide) in Aqueous Solutions. Fluorescene and Lighting-Scattering Studies Department of Pgysical Chemistry, University of Uppsala, Macrimolecules 1996, 29, 2229-2243.

* cited by examiner

*Primary Examiner* — Vickey Nerangis

(74) *Attorney, Agent, or Firm* — Aseem V. Mehta; Nathalie Tietcheu

(57) ABSTRACT

The present disclosure generally relates to a water soluble or dispersible composition comprising a hydrophobically modified polyalkylene glycol having mono- and di- end capped hydrophobic groups. Additionally, the present disclosure also relates to applications thereof in various industrial areas such as coatings.

8 Claims, 3 Drawing Sheets

WATER SOLUBLE OR DISPERSIBLE COMPOSITION

CROSS-REFERENCE

This application is a divisional of U.S. application Ser. No. 17/261,800 filed on Jan. 20, 2021, which was a national stage of PCT Application No. PCT/US19/042662 filed Jul. 19, 2019, which claims priority of the provisional application No. 62/701,158 filed Jul. 20, 2018, each of which are hereby incorporated by reference herein in their entirety.

BACKGROUND

1. Field

The presently disclosed process(es), procedure(s), method(s), product(s), result(s), and/or concept(s) (collectively referred to hereinafter as the "present disclosure") relates generally to a water soluble or dispersible composition comprising a hydrophobically modified polyalkylene glycol having mono- and di- end capped hydrophobic groups. Additionally, the present disclosure relates to applications thereof in various industrial areas such as coatings.

2. Background

Water-soluble polymers (also commonly referred to as "thickeners" or "rheology modifiers") are widely used in many industrial water-borne systems as additives to modify their flow behavior. Thickeners increase and maintain viscosity at required levels under specified processing conditions and end use situations. Thickeners are useful, for example, in decorative and protective coatings, paper coatings, cosmetics and personal care products, detergents, pharmaceuticals, adhesives and sealants, agricultural formulations, and petroleum drilling fluids.

In recent years, synthetic associative thickeners have increased in importance, particularly in controlling the rheology of waterborne coatings and latex paints. Since synthetic associative thickeners are prepared from basic chemicals, they can be prepared with certain properties in mind. In other words, synthetic associative thickeners can be tailored for desired and/or targeted properties from the ground up. Synthetic associative thickeners serve several roles in aqueous systems. For instance, in latex paints and waterborne coatings, the thickener can provide improved stability and pigment suspension, as well as improved rheological and application properties. In personal care products, the thickeners can provide improved body, feel, smoothness, and richness of the product, making the product aesthetically more pleasing.

Rheology modifiers used in water borne coatings or paints can control viscosity over a wide shear rate range. They are typically classified and referred as low-, mid- and high-shear rate viscosity builders. A low-shear rate viscosity builder is used when paint is stored in a can and/or immediately after it has been applied to a substrate. Sufficient low-shear viscosity builder is needed to resist pigment settling and film sag but to provide the required leveling of the applied film paint. Brookfield viscosity is a common measure of paint's low-shear viscosity.

A mid-shear viscosity builder is used when paint is stirring, pouring, and sometimes pumping. The mid-shear viscosity builder facilitates good in-can appearance and handling properties and may also affect spattering. Common measures of the mid-shear viscosity include Stormer viscosity, Brookfield viscosity at high rpm and Rotothinner viscosity. The Stormer viscosity is expressed as Kreb Units (KU). Thus, a rheology modifier providing a mid-shear viscosity is often referred as a "KU viscosity builder."

A high-shear viscosity builder is used when paint is used for brushing, rolling and spraying. The high-shear viscosity builder influences brush and roller drag as well as film build, thus contributes to hiding. The high-shear viscosity is often measured using a cone-plate viscometer including a standard ICI viscometer. Thus, a rheology modifier that offers a good high-shear viscosity is often referred to as a "ICI viscosity builder."

With every change in shear rate, paint undergoes a change in viscosity from low shear to mid shear ultimately to high shear whereby a higher shear rate leads to a low viscosity. Thus, a rheology modifier has to be developed to satisfy the changing shear rates of the paint for optimizing sag resistance, flow and leveling across a range of shear rate.

Unfortunately, it is very challenging to maintain sag resistance as well as good flow and leveling using one rheology modifier. As sag resistance improves, flow and leveling worsen. Though the paint will not drip, brush and roller marks will be left due to compromised workability from poor flow and leveling. A paint that exhibits good flow and leveling but poor sag resistance will result in dripping. A coating formulator must optimize for sag and flow as well as maintaining or improving other paint properties such as hiding with a minimum number of coats, open time extension, syneresis resistance, roller and brush application properties, and stain resistance. For example, it is difficult to use one rheology modifier to meet both KU and ICI viscosity requirement in paint formulations. In some applications, a combination of a KU viscosity rheology modifier and an ICI viscosity rheology modifier has to be used.

It is desirable to increase ICI viscosity and the efficiency of ICI building rheology modifiers without concomitant increase in KU viscosity because an increase in KU viscosity limits the formulator's ability to add a KU building rheology modifier to the formulation. A formulation with insufficient KU building rheology modifier added can exhibit poor resistance to sagging and dripping when applied to the substrate. It is also desirable to use one rheology modifier to optimize the paint performance through a range of shear rate.

DETAILED DESCRIPTION

Figure 1:
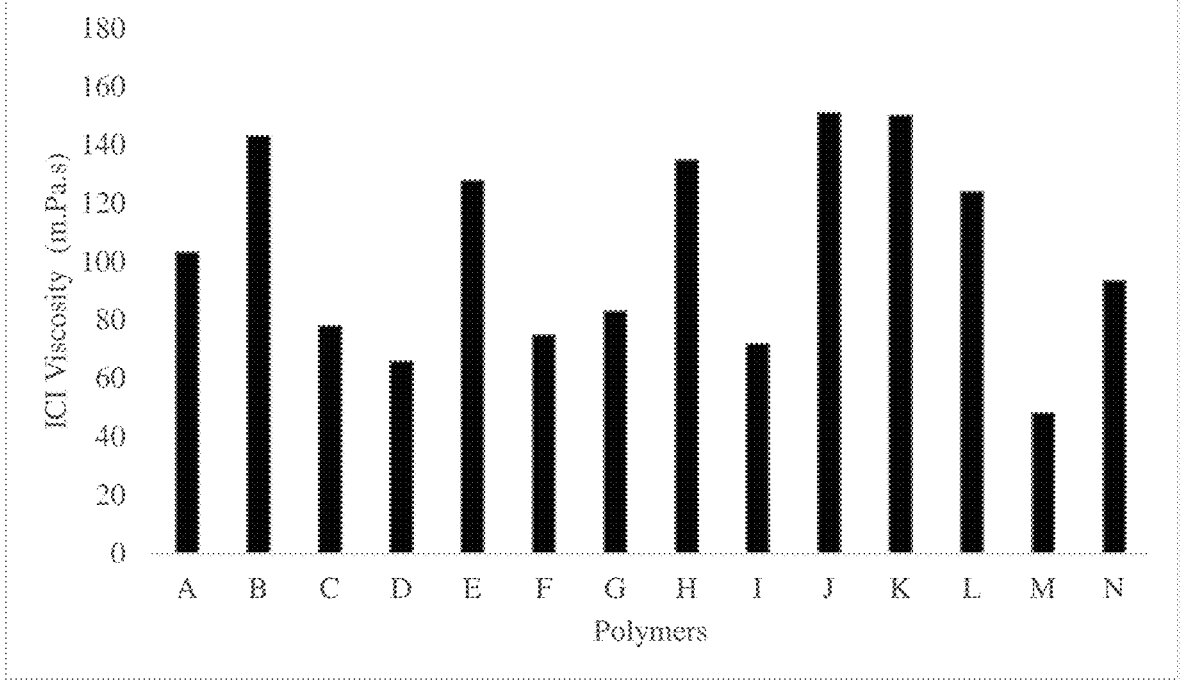
FIG. 1 is a graph showing the ICI viscosities for Polymers A-N.
Figure 2:
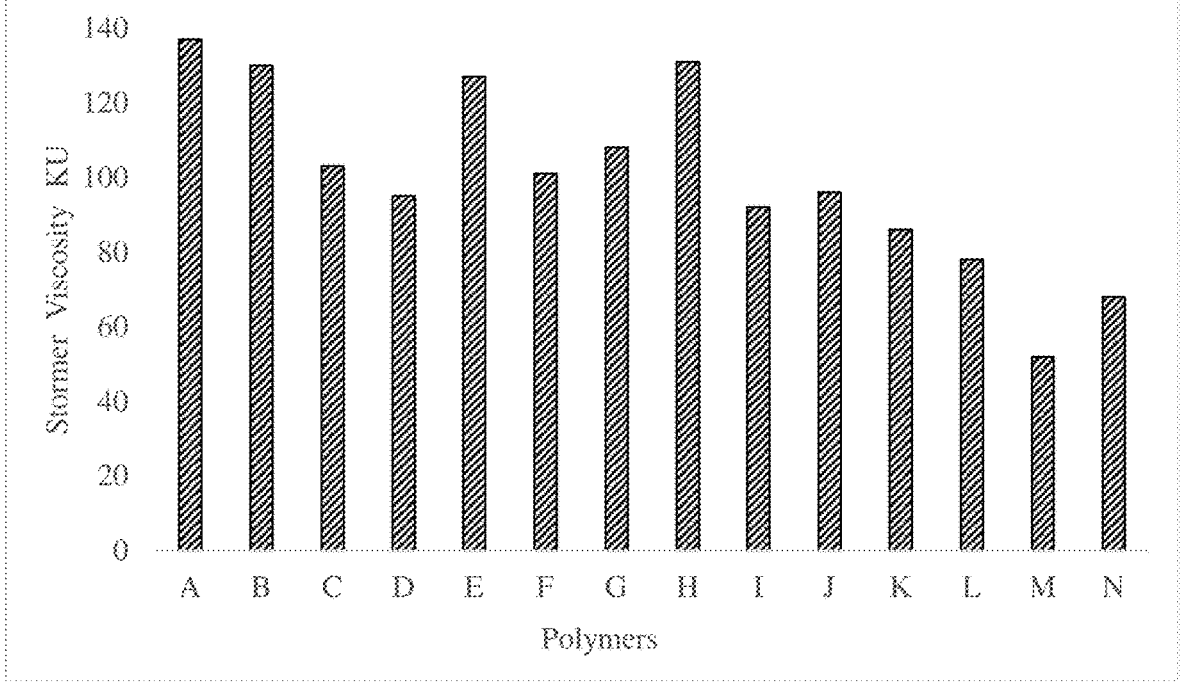
FIG. 2 is a graph showing the Stormer viscosities for Polymers A-N.
Figure 3:
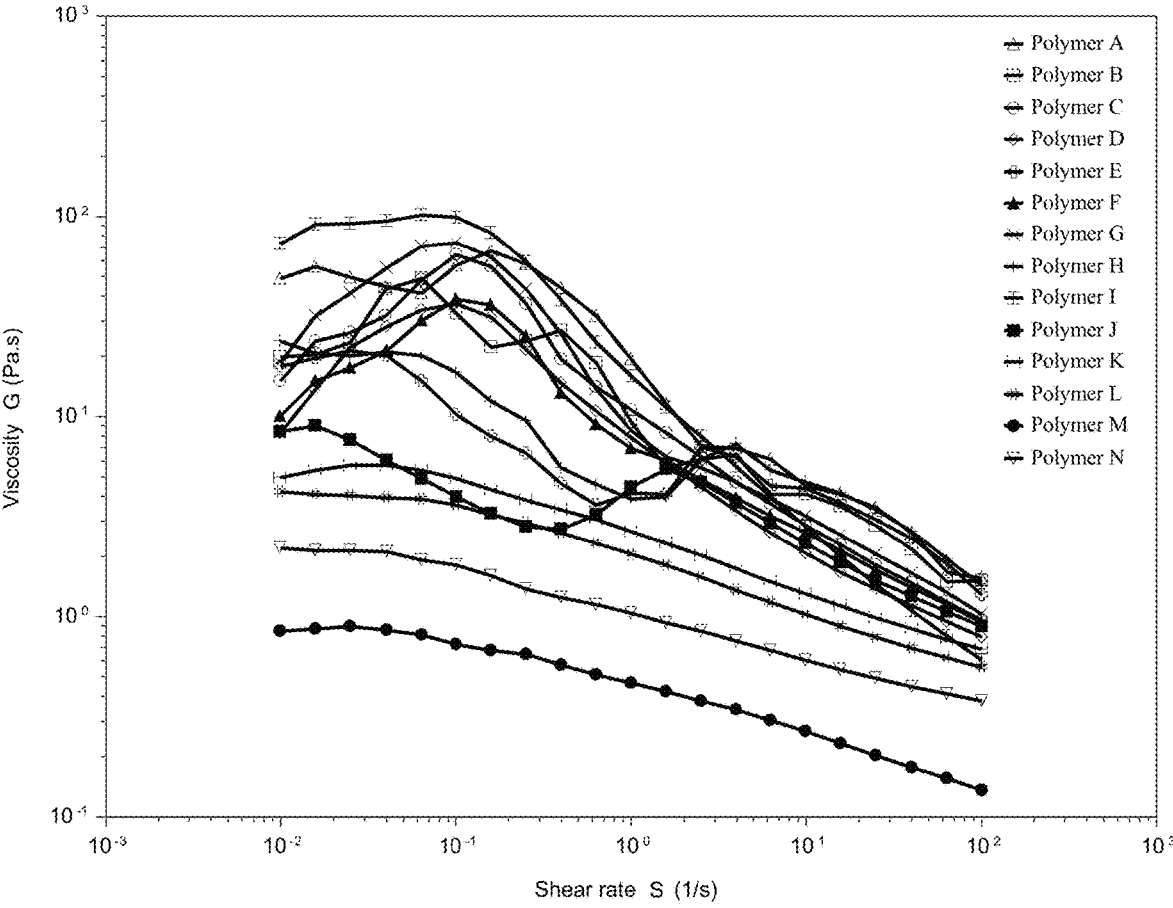
FIG. 3 is a graph showing the viscosity of paints versus shear rate for Polymers A-N.

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in many ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "alkyl" refers to a saturated linear or branched hydrocarbon group of 1 to 50 carbons.

The term "alkylene" as used herein refers to an unsaturated, linear or branched hydrocarbon group of 1 to 50 carbon atoms with one or more carbon-carbon double bonds.

The term "aryl" refers to a mono- or polynuclear aromatic hydrocarbon group including carbocyclic and heterocyclic aromatic groups.

The term "monomer" refers to a small molecule that chemically bonds during polymerization to one or more monomers of the same or different kind to form a polymer.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many. Non-limiting examples of polymers include homopolymers, and non-homopolymers such as copolymers, terpolymers, tetrapolymers and the higher analogues.

All percentages, ratio, and proportions used herein are based on a weight basis unless other specified.

The present disclosure is directed to a water soluble or dispersible composition comprising a hydrophobically modified polyalkylene glycol having mono- and di- end capped hydrophobic groups. The di-end capped hydrophobic groups comprises at least 50%, or at least 55%, or at least 60%, or at least 65%, or at least 70%, or from about 70% to about 98% by weight based on the total weight of the end capped hydrophobic groups.

A weight average molecular weight of the hydrophobically modified polyalkylene glycol can be in a range of from about 500 to about 2,000,000 Daltons, or from about 500 to about 50,000 Daltons, or from about 1,000 to about 1,500, 000 Daltons, or from about 1,000 to about 40,000 Daltons, or from about 3,000 to about 30,000 Daltons, or from about 5,000 to about 1,000,000 Daltons, or from about 15,000 to about 500,000 Daltons, or from about 20,000 to about 100,000 Daltons.

Suitable polyalkylene glycol can include, but are not limited to, polyethylene glycol (PEG), polypropylene glycol (PPG), polybutylene glycol and polytetrahydrofuran. The polyalkylene glycol can also be a copolymer of at least two alkylene oxides which can be selected from the group consisting of ethylene oxide, propylene oxide and butylene oxides. In one non-limiting embodiment, the copolymer can be polyethylene glycol-polypropylene glycol.

In one non-limiting embodiment, the polyalkylene glycol is polyethylene glycol (PEG). PEGs are prepared by polymerization of ethylene oxide and are commercially available over a wide range of number average molecular weights from about 300 to about 10,000,000 Daltons. The molecular weights of the PEGs used in the present disclosure can be varied from about 1,000 to about 5,000,000 Daltons, or from about 2,000 to about 2,000,000 Daltons, or from about 3,000 to about 1,000,000 Daltons, or from about 5,000 to about 60,000 Daltons.

Polyethylene glycol can include commercial products, for example but not by way of the limitation, Polyethylene Glycol 200, Polyethylene Glycol 300, Polyethylene Glycol 400, Polyethylene Glycol 600, Polyethylene Glycol 1,000, Polyethylene Glycol 1,500, Polyethylene Glycol 2,000, Polyethylene Glycol 3,000, Polyethylene Glycol 3,350, Polyethylene Glycol 4,000, Polyethylene Glycol 4,600, Polyethylene Glycol 6,000, Polyethylene Glycol 8,000, Polyethylene Glycol 10,000, Polyethylene Glycol 12,000, Polyethylene Glycol 20,000, Polyethylene Glycol 35,000, and Polyethylene Glycol 40,000 that are commercially available from Sigma-Aldrich; and Polyglykol 400, Polyglykol 600, Polyglykol 4,000S, Polyglykol 8,000S, Polyglykol 9,000S, Polyglykol 20,000S, and Polyglykol 35,000S that are commercially available from Clariant.

Examples of polypropylene glycol can include, but are not limited to, Poly(propylene glycol) 425, Poly(propylene glycol) 725, Poly(propylene glycol) 1,000, Poly(propylene glycol) 2,000, Poly(propylene glycol) 2,700 and Poly(propylene glycol) 4,000, which are all commercially available from Sigma-Aldrich.

For the copolymer of polyethylene glycol-polypropylene glycol, a weight ratio of PPG/PEG can be varied at about 80:20 to about 3:97, or about 70:30 to about 5:95, or about 50:50 to about 10:90. Examples of polyethylene glycol-polypropylene glycol can include, but are not limited to, Poly(ethylene glycol)-block-poly-(propylene glycol)-block-poly-(ethylene glycol) having $M_n$ 8,400, commercially available from Sigma-Aldrich.

Examples of polytetrahydrofuran can include, but are not limited to, Polytetrahydrofuran 250, Polytetrahydrofuran 650, Polytetrahydrofuran 1,000, Polytetrahydrofuran 2,000, and Polytetrahydrofuran 2,900, which are all commercially available from Sigma-Aldrich.

The hydrophobic groups can be either the same or different molecules and can be selected from the group consisting of hydrocarbyl, alkyl, aryl, arylalkyl, cycloaliphatic, perfluoroalkyl, carbosilyl, polycyclic groups, and complex dendritic. The hydrophobic groups may comprise at least one heteroatom including nitrogen, oxygen, sulfur and phosphorus. These hydrophobic groups can be either saturated or unsaturated, branched or linear. The upper limit of the number of carbon atoms in the hydrophobic groups can be 40 carbons, or 27 carbons, or 22 carbons or 18 carbons; the lower limit of the number of carbon atoms in the hydrophobic groups can be 1 carbon, or 4 carbons, or 8 carbons, or 10 carbons, or 12 carbons. When the hydrophobic groups are independently selected from alkyl, perfluoroalkyl and carbosilyl, the carbon range can be varied from 1 to 40 carbons, or 4 to 24 carbons, or 6 to 20 carbons, or 8 to 16 carbons, or 10 to 16 carbons. When the hydrophobic groups are aryl, arylalkyl, cycloaliphatic, and polycyclic groups, the carbon range is 3 to 40, or 6 to 29 carbons, or 14 to 25 carbons.

In one non-limiting embodiment, the hydrophobic group can be alkyl having 1 to 40 carbons, or 4 to 24 carbons, or 6 to 20 carbons, or 8 to 16 carbons, or 10 to 16 carbons. Specific examples of the hydrophobic groups can include, but are not limited to, octyl, nonyl, decyl, undecyl, dodecyl, hexadecyl, and octadecyl groups.

The hydrophobically modified polyalkylene glycols can comprise from about 0.1% to about 10%, or from about 0.4% to about 8%, or from about 0.8% to about 5% by weight of the hydrophobic groups based on the total weight of the hydrophobically modified polyalkylene glycols.

The hydrophobically modified polyalkylene glycol can be made by mixing molten polyalkylene glycol with caustic at elevated temperature followed by adding a hydrophobic agent that is end capped to the polyalkylene glycol.

The hydrophobic agent can be alkyl halides and/or monoepoxides. Examples of the alkyl halides can include, but are not limited to, 1-bromobutane, 1-bromohexane, 1-bromoheptane, 1-bromooctane, 1-bromodecane, 1-bromododecane, 1-bromotetradecane, 1-bromohexadecane, 1-bromooctadecane, and 1-bromodocosane. Examples of the monoepoxides can include, but are not limited to, allylglycidyl ether (AGE), 2-Ethylhexylglycidyl ether (EHGE), hexadecylglycidyl ether (HAGE-13, commercially available from Sachem), Oxirane [(Docosyloxy), methyl] (HAGE-22, commercially available from Sachem), naphthylglycidyl ether (NGE), n-butylglycidyl ether (n-BGE), iso-Butylglycidyl ether (iso-BGE), and Cardura™ E10P glycidyl ether and glycidyl ester of Versatic™ acid 10 (Hexion).

The water soluble or dispersible composition comprising the hydrophobically modified polyalkylene glycol can be used as a rheology modifier in coatings. The water soluble or dispersible composition can also include other rheology modifiers comprising a polysaccharide or its derivatives. The polysaccharide and its derivatives can be selected from a group consisting of cellulosics, chitins, chitosans, starches, galactomannans and their derivatives. In one non-limiting embodiment, the cellulose derivative is cellulose ether including hydroxyethyl cellulose, hydroxypropyl cellulose, methyl cellulose, methylhydroxyethyl cellulose, methylhydroxypropyl cellulose, and carboxymethyl cellulose.

In another non-limiting embodiment, guar derivatives can include, but are not limited to, carboxymethyl guar, carboxymethylhydroxypropyl guar, cationic hydroxypropyl guar, hydroxyalkyl guar such as hydroxyethyl guar, hydroxypropyl guar, and hydroxybutyl guar, carboxylalkyl guars such as carboxymethyl guar, carboxylpropyl guar, carboxybutyl guar, and the like.

The present disclosure also relates to an aqueous protective coating composition comprising a hydrophobically modified polyalkylene glycol and a latex polymer. The hydrophobically modified polyalkylene glycol is the same as those described previously. A wide variety of the latex polymers can be used in the aqueous protective coating composition of the present disclosure. They can be made by polymerization of various ethylenically unsaturated monomers, such as ethylene, vinyl, and acrylic monomers. Oftentimes, latex polymers are made by copolymerizing more than one monomer to achieve several desired properties, particularly for applications in latex paints with very little or no volatile organic compounds (VOCs). Examples of the latex polymer used in the aqueous protective coating composition can include, but are not limited to, homo- or co-polymers of vinyl acetate, methacrylic acid, methylacrylate, methylmethacrylate, ethylacrylate, butyl acrylate, styrene, ethylene, vinyl chloride, vinyl ester of versatic acid (VeoVa), vinyl propionate, butadiene, acrylonitrile, maleates, and fumarates. In one non-limiting embodiment, the latex polymer is selected from the group consisting of acrylics, vinyl-acrylics and styrene-acrylics.

Other latex polymers can include, but are not limited to, alkyds, cellulosics (cellulose nitrate and cellulose esters), coumarone-indenes, epoxies, esters, hydrocarbons, melamines, natural resins, oleo resins, phenolics, polyamides, polyesters, rosins, silicones, terpenes, ureas, urethanes, vinyls, and the like.

The aqueous protective coating composition can further comprise a pigment, a coalescent, a solvent, a wetting agent, a defoamer, a matting agent, a dispersant, a thickener, a biocide, a mildewcide, and a surfactant. The aqueous protective coating composition may optionally contain other components such as those generally used in such compositions. Typical components include, but are not limited to, one or more of the following: fillers, dryers, flattening agents, plasticizers, stabilizers, viscosifiers, suspension agents, flow control agents, anti-skinning agents, extenders, filming aids, cross-linkers, surface improvers, corrosion inhibitors, leveling aids, surface improvers, humectants/wet-edge agents (e.g., ethylene glycol, propylene glycol, and hexylene glycol), pH modifiers, and other ingredients useful in aqueous protective coating compositions.

Specific examples of the pigments can include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, barium sulfate, calcium silicate, zinc oxide, magnesium aluminum silicate, precipitated calcium carbonate, ground calcium carbonate, kaolin, talc, clay, barium sulfate, glass beads, calcium sulfate, barium sulfate, zinc sulfide, zinc carbonate, satin white, aluminum silicate, diatomaceous earth, magnesium silicate, synthetic amorphous silica, colloidal silica, colloidal alumina, fumed alumina, fumed silica, pseudo-boehmite, aluminum hydroxide, alumina, modified alumina, lithopone, zeolite, hydrated halloysite, magnesium carbonate, magnesium hydroxide, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow).

Oftentimes, titanium dioxide grades used in the aqueous protective coating composition are surface modified with various inorganic oxides, such as silicates, aluminates, and zirconates. Aluminum silicate, nepeline syenite, mica, calcium carbonate, and/or diatomaceous earth can also be employed.

In one non-limiting embodiment, the hydrophobically modified polyalkylene glycol of the present disclosure can be applied as a high-shear rate builder to increase ICI viscosity without concomitant increase in KU viscosity. In this application, the hydrophobically modified polyalkylene glycol can be characterized by the following formula:

$$Ef=(\text{Dicap }\%)\times(PEG\ M_n)^3/10^{12}$$

where Ef is an efficiency factor, Dicap % is a weight percentage of the di-end capped hydrophobic groups based on the total end capped hydrophobic groups and PEG $M_n$ is a number average molecular weight of PEG for making the hydrophobically modified polyalkylene glycol. Ef can be varied from about 5 to about 15,000, or from about 25 to about 13,000, or from about 550 to about 13,000.

A mixture of the hydrophobically modified polyalkylene glycols comprising different types of hydrophobic groups can also be used to adjust the viscosities to meet the requirements for coating formulations. For example, it was surprising to find that by incorporating a mixture comprising at least two hydrophobically modified polyalkylene glycols having different types of hydrophobic groups into water-borne coatings and independently adjusting the amounts of the hydrophobically modified polyalkylene glycols, the Stormer viscosity and ICI viscosity of coatings can be significantly enhanced. By selecting appropriate hydrophobic groups and their amounts grafted onto polyalkylene glycol base polymers, a balance of the Stormer viscosity and ICI viscosity can be achieved in water-borne coatings. These mixed hydrophobically modified polymer systems may comprise blends of at least two hydrophobically modified polymers thereby allowing coating formulators to tailor the balance of Stormer and ICI viscosities and other rheological properties, such as flow, leveling, spatter resistance and ability to suspend the dispersed phase of the coating composition.

In one non-limiting embodiment, the hydrophobically modified polyalkylene glycols can comprise mixed alkyl and/or alkylene hydrophobic groups. The alkyl and/or alkylene groups can comprise from 4 to 22 carbons, or from 6 to 18 carbons, or from 8 to 16 carbons. In another non-limiting embodiment, the hydrophobically modified polyalkylene glycols can comprise mixed aryl, arylalkyl, cycloaliphatic and polycyclic hydrophobic groups that can comprise from 3 to 40 carbons, or from 6 to 29 carbons, for from 14 to 25 carbons. In yet another non-limiting embodiment the hydrophobically modified polyalkylene glycols can comprise mixed alkyl, or alkylene aryl, arylalkyl, cycloaliphatic and polycyclic hydrophobic groups.

In one non-limiting embodiment, a weight ratio of the two different types of hydrophobic groups can be varied from about 25:1 to about 1:25, or from about 10:1 to about 1:10, or from about 5:1 to about 1:5.

The amount of the hydrophobically modified polyalkylene glycols used in the aqueous protective coating composition of the present disclosure is the amount effective in providing the desired thickening and rheological properties to the coating composition. In one non-limiting embodiment, the hydrophobically modified polyalkylene glycol can be used in a range of about 0.1 to about 5 wt %, or in a range of about 0.1 to about 3 wt %, or from about 0.2 to about 3 wt %, or from about 1 wt % to about 3 wt % of the total aqueous protective composition.

The following examples illustrate the present disclosure, parts and percentages being by weight, unless otherwise indicated. Each example is provided by way of explanation of the present disclosure, not limitation of the present disclosure. In fact, it will be apparent to those skilled in the art that various modifications and variations can be made in the present disclosure without departing from the scope or spirit of the invention. For instance, features illustrated or described as part of one embodiment, can be used on another embodiment to yield a still further embodiment. Thus, it is intended that the present disclosure covers such modifications and variations as come within the scope of the appended claims and their equivalents.

EXAMPLES

Solid Polymer Preparation

In the examples, the following abbreviations are used:

PEG: Polyethylene glycol

NaOH: Sodium hydroxide

C10 Br: 1-Bromodecane

C12 Br: 1-Bromododecane

C14 Br: 1-Bromotetradecane

C16 Br: 1-Bromohexadecane $M_n$: Number-average molecular weight $M_w$: Weight-average molecular weight $M_z$: Z-average molecular weight Example 1: Preparing Solid Polymers A and C-N A reactor was charged with PEG and NaOH. The contents of the reactor were mixed for TIME1 under vacuum of 29 in. Hg while the temperature was increased to TEMP1. The vacuum was turned off and the temperature was adjusted to TEMP2. Water was added and the contents of the reactor were mixed for TIME2. The temperature was adjusted to TEMP3 and alkyl halide was added in one portion. The temperature was adjusted to TEMP4. Once at TEMP4, the contents of the reactor were mixed for TIME3. The contents of the reactor were mixed for TIME4 at TEMP4 under 29 in. Hg for making Polymers A, D, and H-K. No vacuum was applied for making Polymers C, E, F, G and L-N. The contents of the reactor were discharged and allowed to cool to 20-25° C. to give solid Polymers A and C-N. Table 1 lists the amounts of the reactants and Table 2 lists the reaction conditions for making the solid Polymers A and C-N, wherein the unit for the TIME is a minute and for the TEMP is a degree of Celsius.

TABLE 1

Ingredients for Solid Polymer Preparation

| Polymer | Description | PEG $M_n$ | PEG $M_w$ | PEG (g) | Water (g) | NaOH (g) | C10 Br (g) | C12 Br (g) | C14 Br (g) | C16 Br (g) |
|---|---|---|---|---|---|---|---|---|---|---|
| A | C12 6K PEG | 5,510 | 5,710 | 1,200 | 2.71 | 74.92 | — | 186.70 | — | — |
| C | C12 9K PEG | 8,270 | 8,600 | 1,350 | 1.48 | 49.00 | — | 126.00 | — | — |
| D | C12 9K PEG | 8,143 | 8,510 | 1,350 | 0.90 | 33.15 | — | 130.00 | — | — |
| E | C12 9K PEG | 8,143 | 8,510 | 1,350 | 1.50 | 49.75 | — | 136.50 | — | — |
| F | C12 9K PEG | 8,270 | 8,600 | 1,350 | 1.48 | 49.00 | — | 132.50 | — | — |
| G | C12 9K PEG | 8,270 | 8,600 | 1,350 | 1.48 | 49.00 | — | 134.00 | — | — |
| H | C12 9K PEG | 8,270 | 8,600 | 1,350 | 2.04 | 56.15 | — | 140.00 | — | — |
| I | C10 9K PEG | 8,270 | 8,600 | 1,350 | 2.03 | 56.15 | 124.50 | — | — | — |
| J | C12 20K PEG | 18,100 | 19,100 | 1,200 | 1.94 | 22.80 | — | 56.90 | — | — |
| K | C12 30K PEG | 28,700 | 30,600 | 1,200 | 1.80 | 14.33 | — | 42.00 | — | — |
| L | C12 30K PEG | 28,700 | 30,600 | 1,200 | 1.80 | 14.21 | — | 30.00 | — | — |
| M | C10 30K PEG | 28,700 | 30,600 | 1,200 | 1.80 | 14.33 | 37.30 | — | — | — |
| N | C12 30K PEG | 29,900 | 32,100 | 1,145 | 1.65 | 13.02 | — | 24.9 | — | — |
| O | C14 9K PEG | 7,610 | 8,030 | 1,350 | 2.24 | 53.20 | — | — | 175.00 | — |
| P | C14 9K PEG | 7,610 | 8,030 | 1,350 | 2.24 | 53.20 | — | — | 165.00 | — |
| Q | C14 9K PEG | 7,610 | 8,030 | 1,350 | 2.24 | 53.20 | — | — | 160.00 | — |
| R | C16 30K PEG | 27,100 | 30,600 | 1,200 | 1.80 | 15.06 | — | — | — | 35.00 |
| S | C16 30K PEG | 27,100 | 30,600 | 1,200 | 1.80 | 15.06 | — | — | — | 38.50 |
| T | C16 30K PEG | 27,100 | 30,600 | 1,200 | 1.80 | 15.06 | — | — | — | 42.00 |

TABLE 2

Reaction Conditions for Polymer Preparation

| Polymer | TIME1 | TIME2 | TIME3 | TIME4 | TEMP1 | TEMP2 | TEMP3 | TEMP4 |
|---|---|---|---|---|---|---|---|---|
| A | 30 | 45 | 130 | 80 | 80.0 | 80.0 | 79.0 | 120.0 |
| C | 30 | 17 | 120 | — | 90.0 | 90.0 | 90.0 | 120.0 |
| D | 30 | 35 | 65 | 70 | 80.0 | 80.0 | 80.0 | 120.0 |
| E | 30 | 35 | 60 | 30 | 95.0 | 95.0 | 96.0 | 120.0 |
| F | 33 | 18 | 120 | — | 90.0 | 90.0 | 90.0 | 120.0 |
| G | 43 | 16 | 120 | — | 90.0 | 90.0 | 90.0 | 120.0 |
| H | 40 | 20 | 90 | 60 | 90.0 | 91.0 | 91.0 | 120.0 |
| I | 40 | 15 | 90 | 75 | 90.0 | 90.0 | 90.0 | 120.0 |
| J | 50 | 20 | 90 | 65 | 90.0 | 89.0 | 90.0 | 120.0 |
| K | 30 | 30 | 90 | 60 | 90.0 | 88.0 | 91.0 | 120.0 |
| L | 50 | 20 | 120 | — | 91.0 | 91.0 | 91.0 | 120.0 |
| M | 48 | 15 | 120 | — | 90.0 | 92.0 | 91.0 | 120.0 |
| N | 40 | 25 | 125 | — | 90.0 | 88.0 | 89.0 | 120.0 |
| O | 30 | 10 | 120 | 30 | 90.0-93.0 | 90.0 | 90.0 | 120.0 |
| P | 40 | 10 | 120 | 30 | 90.0 | 90.0 | 90.0 | 120.0 |
| Q | 30 | 10 | 155 | 30 | 90.0-103.0 | 89.0 | 90.0 | 120.0-121.0 |
| R | 40 | 20 | 150 | — | 91.0-93.0 | 93.0 | 92.0 | 120.0 |
| S | 45 | 20 | 150 | — | 89.0-92.0 | 92.0 | 92.0 | 119.0-121.0 |
| T | 45 | 15 | 150 | — | 90.0-91.0 | 91.0 | 91.0 | 120.0 |

Example 2: Preparation for Solid Polymer B

A reactor was charged with 2,700 g C12 9K PEG and 98 g NaOH. The contents of the reactor were mixed for about 37 minutes under vacuum of 29 in. Hg while the temperature was increased to about 90° C. The vacuum was turned off and the temperature was adjusted to about 90° C. 2.95 g water was added and the contents of the reactor were mixed for about 17 minutes. The temperature was adjusted to about 90° C. and 268.5 g C12 Br was added over 30 minutes while adjusting the temperature to about 120° C. Once at 120° C., the contents of the reactor were mixed for about 60 minutes. The contents of the reactor were discharged and allowed to cool to 20-25° C. to give solid Polymer B.

Example 3: Preparation for Solid Polymers O-T

A reactor was charged with PEG and NaOH. The contents of the reactor were mixed for TIME1 under vacuum of 29 in. Hg while the temperature was increased to TEMP1. The vacuum was turned off and the temperature was adjusted to TEMP2. Water was added and the contents of the reactor were mixed for TIME2. The temperature was adjusted to TEMP3 and alkyl halide was added over 30-40 minutes. The temperature was adjusted to TEMP4. Once at TEMP4, the contents of the reactor were mixed for TIME3. The contents of the reactor were mixed for TIME4 at TEMP4 under 29 in. Hg for making Polymers O-Q. No vacuum was applied for making Polymers R-T. The contents of the reactor were discharged and allowed to cool to 20-25° C. to give solid Polymers O-T. Table 1 lists the amounts of reactants and Table 2 lists the reaction conditions for making the solid Polymers O-T, wherein the unit for TIME is a minute and for the TEMP is a degree of Celsius.

Characterization of Solid Polymers

High Pressure Liquid Chromatography (HPLC) Measurement:

HPLC was used for determining the degree of hydrophobic endcapping. An Agilent 1200 Series Quaternary LC System and OpenLAB Chromatography Data System, commercially available from Agilent Technologies (Santa Clara, CA), were used under reversed-phase conditions with a water/acetonitrile gradient and evaporative light scattering detection (ELSD). Polyethylene glycol (PEG), monocapped PEG and dicapped PEG were estimated by normalized area percent.

Reagents:
1. Deionized water, high purity—18 mega ohm from laboratory water purification system.
2. Burdick & Jackson HPLC Grade Acetonitrile, available from Honeywell Burdick & Jackson, 101 Columbia Road, Morristown, NJ 07962, Cat. No. 015-4.
3. Phosphoric Acid, 85%, ACS Reagent grade ($H_3PO_4$, CAS 7664-38-2)—www.sigmaaldrich.com, Cat. No. 466123 or equivalent.
4. Burdick & Jackson HPLC Grade Methanol, available from Honeywell Burdick & Jackson, 101 Columbia Road, Morristown, NJ 07962, Cat. No. 230-4.

Sample Preparation:

Samples were prepared by weighing ~100 mg of polymer sample. HPLC methanol (nominally 10 mL) and 2 drops of concentrated phosphoric acid were added. The samples were vortexed and/or gently heated (~50° C.) until dissolved in solution.

Apparatus Set-up—All Agilent modules in the set-up included:
Agilent G1322A 1200 Series Vacuum Degasser
Agilent G1311A 1200 Series Quaternary Pump
Agilent G1329A 1200 Series Standard Autosampler
Agilent G1316A 1200 Series Thermostated Column Compartment
Agilent G7102A 1290 Infinity II ELSD
Agilent OpenLAB Chromatography Data System
Analysis Conditions for HPLC was described as follows:
Mobile Phase—Water/acetonitrile gradient
Flow Rate—0.5 ml/min
Column—4.0×50 mm, 3 micron YMC-Pack Ph, Part No. PH12S03-0504WT (YMC America, Allentown, PA)
Column Temperature—40° C.
Sample Concentration—Typically 10 mg/ml—dissolved in acidified methanol
Injection volume—10 μl Endcapping is reported as normalized area percent of the PEG, monocapped PEG and dicapped PEG peaks.

Size Exclusion Chromatography (SEC) Measurement

SEC was used for measuring polymer molecular weight distributions. Alliance™ HPLC System and Empower™ Chromatography Data System, commercially available from the Waters Corporation (Milford, MA) were used to measure the molecular weights. As used herein with respect to polymers, the terms molecular weight, average molecular weight, mean molecular weight, and apparent molecular weight refer to the arithmetic mean of the molecular weight of individual macromolecules as measured by SEC. The relative molecular weight averages from the SEC were calculated versus poly(ethylene glycol/ethylene oxide) (PEG/PEO) standards with narrow molecular weight distribution.

Apparatus Set-up—All Waters modules in the set-up included:
Waters M515 solvent delivery system
Waters M2707 autosampler
Waters M2414 differential refractive index detector (DRI) for the relative SEC
Column bank(s)—see the details in the "Analysis Conditions" section below
Waters Empower™ 3 software
RI range 1.00 to 1.75 RIU
Measurement range $7×10^{-7}$ RIU
Drift—$2×10^{-7}$ RIU
Analysis Conditions for SEC was described as follows:
Mobile Phase—70% Methanol/30% 0.6M Lithium acetate (pH 4.8) (w/w)
Flow Rate—1.0 ml/mi
Columns—1 Shodex KW-804 Protein columns (8 mm×300 mm)+1 Shodex KW-803
Protein columns (8 mm×300 mm) in series (Showa Denko America, Inc., 420 Lexington Avenue, Suite 2335A, New York, NY 10170, USA)
Column Temperature 40° C.
DRI (differential refractive index) Detector Temperature 40° C.
Calibration—PEO/PEG standards with narrow molecular weight distribution (PSS-USA, Inc. Amherst Fields Research Park, 160 Old Farm Road, Amherst, MA 01002)
Sample Concentration—Typically 1.5 mg/ml (unless otherwise noted)—dissolved directly into mobile phase
Injection volume—100 μl Table 3 lists the characterization data of Solid Polymers A-N.

Table 4 lists the characterization of data of Solid Polymers O-T.

TABLE 3

Polymer Analytical Summary

| Poly-mer | Hydro-phobic Group | SEC $M_n$ | SEC $M_w$ | SEC $M_z$ | HPLC Monocap (%) | HPLC Dicap (%) | Ef |
|---|---|---|---|---|---|---|---|
| A | n-dodecyl | 5,650 | 5,970 | 6,220 | 5.75 | 94.25 | 17 |
| B | n-dodecyl | 8,540 | 8,910 | 9,180 | 2.15 | 97.85 | 61 |
| C | n-dodecyl | 7,620 | 8,540 | 9,040 | 39.48 | 59.91 | 27 |
| D | n-dodecyl | 8,360 | 8,740 | 9,000 | 35.82 | 62.50 | 37 |
| E | n-dodecyl | 8,280 | 8,720 | 8,980 | 10.52 | 89.47 | 51 |
| F | n-dodecyl | 8,280 | 8,690 | 8,960 | 41.55 | 57.66 | 33 |
| G | n-dodecyl | 8,530 | 8,870 | 9,110 | 35.37 | 64.18 | 40 |
| H | n-dodecyl | 8,450 | 8,840 | 9,100 | 8.66 | 91.33 | 55 |
| I | n-decyl | 8,420 | 8,840 | 9,100 | 5.22 | 94.78 | 57 |
| J | n-dodecyl | 18,300 | 19,600 | 20,400 | 5.04 | 94.96 | 582 |
| K | n-dodecyl | 27,400 | 30,400 | 31,900 | 2.95 | 97.05 | 1,996 |
| L | n-dodecyl | 30,200 | 32,100 | 33,400 | 25.82 | 74.00 | 2,038 |
| M | n-decyl | 28,600 | 31,000 | 32,400 | 0.96 | 99.04 | 2,317 |
| N | n-dodecyl | 30,400 | 32,200 | 33,200 | 44.07 | 54.00 | 1,517 |

TABLE 4

Polymer Analytical Summary

| Polymer | Hydro-phobic Group | SEC $M_n$ | SEC $M_w$ | SEC $M_z$ | HPLC Monocap (%) | HPLC Dicap (%) |
|---|---|---|---|---|---|---|
| O | n-tetradecyl | 7,930 | 8,350 | 8,680 | 8.33 | 91.67 |
| P | n-tetradecyl | 7,610 | 8,180 | 8,560 | 33.06 | 66.94 |
| Q | n-tetradecyl | 7,510 | 9,280 | 8,760 | 47.98 | 51.60 |
| R | n-hexadecyl | 27,200 | 30,700 | 32,300 | 29.37 | 69.88 |
| S | n-hexadecyl | 26,400 | 29,300 | 30,900 | 13.72 | 86.16 |
| T | n-hexadecyl | 2,5100 | 28,900 | 30,500 | 5.17 | 94.83 |

Aqueous Polymer Solutions

Aqueous polymer solutions having 20.00 wt % of solid polymers were prepared by neutralizing the polymers obtained from Examples 1 and 2 in water using acetic acid. After neutralization, 0.50 wt % Acticide MBS® biocide (a mixture of 1,2-benzisothiazolin-3-one (2.50%) and 2-methyl-4-isothiazolin-3-one (2.50%), commercially available from Thor Group Limited); different amounts of Sag* 47 foam control agent, commercially available from Momentiv Performance Materials, and beta cyclodextrin (also known as CAVAMAX® W7), commercially available from Wacker Fine Chemicals, were added to each aqueous polymer solution to provide the aqueous polymer solution having 20.00 wt % of solid polymer. Viscosities of the aqueous polymer solutions having 20.00 wt % of solid polymer were measured using Brookfield Viscometer with LV spindle #4 at 30 rpm and 25° C. The amounts of Sag* 47, beta cyclodextrin, and Brookfield viscosities are listed in Table 5.

Aqueous polymer solutions having 20.00 wt % of solid polymers were prepared by neutralizing the polymers obtained from Example 3 in water using acetic acid. After neutralization, either 0.50 wt % Acticide MBS® biocide or a combination of 0.10% Vantocil 4B® biocide, commercially available from Lonza Group, and 0.02% Biosperse CN7539 biocide, commercially available from Solenis were added. Additionally, either 0.04 wt % Drewplus™ L-1513 foam control agent, commercially available from Ashland, or 0.04 wt % of Sag* 47 foam control agent were added. In some cases, methyl beta cyclodextrin (also known as CAVOSOL® W7 M TL), commercially available from Wacker Fine Chemicals, was added to the aqueous polymer solution to provide the aqueous polymer solution having 20.00 wt % of solid polymer. Viscosities of the aqueous polymer solutions having 20.00 wt % of solid polymer were measured using Brookfield Viscometer with either LV spindle #3 or #4 at 30 rpm and 25° C. The amounts of Sag* 47, Drewplus™ L1513, methyl beta cyclodextrin, Acticide MBS®, Vantocil 1B®, Biosperse CN 7539, the Brookfield viscosities, and the LV spindles used are listed in Table 6.

TABLE 5

Aqueous Polymer Solution

| Polymer Solution | Solid Polymer | Sag* 47 (Wt %) | Beta Cyclodextrin (Wt %) | Brookfield Viscosity (mPa · s) |
|---|---|---|---|---|
| 1 | A | 0.04 | — | 8,660 |
| 2 | B | 0.04 | 0.20 | 6,060 |
| 3 | C | 0.08 | — | 2,810 |
| 4 | D | 0.08 | — | 1,756 |
| 5 | E | 0.08 | — | 5,460 |
| 6 | F | 0.08 | — | 2,600 |
| 7 | G | 0.08 | — | 3,760 |
| 8 | H | 0.08 | 0.20 | 7,080 |
| 9 | I | 0.08 | — | 431 |
| 10 | J | 0.04 | — | 4,620 |
| 11 | K | 0.08 | — | 4,180 |
| 12 | L | 0.04 | — | 3,140 |
| 13 | M | 0.08 | — | 468 |
| 14 | N | 0.04 | — | 2,320 |

TABLE 6

Aqueous Polymer Solution

| olymer Solution | Solid Polymer | Sag* 47 (Wt %) | Drewplus L1513 (Wt %) | Methyl Beta Cyclodextrin (Wt %) | Acticide MBS ® (Wt %) | Vantocil 1B ® (Wt %) | Biosperse CN 7539 (Wt %) | Brookfield Viscosity (mPa · s) | Brookfield Viscometer LV Spindle# |
|---|---|---|---|---|---|---|---|---|---|
| 15 | O | — | 0.04 | 1.50 | 0.50 | — | — | 7,160 | 4 |
| 16 | P | — | 0.04 | 1.50 | 0.50 | — | — | 6,580 | 4 |
| 17 | Q | — | 0.04 | 1.50 | 0.50 | — | — | 3,320 | 4 |
| 18 | R | 0.04 | — | 1.31 | — | 0.10 | 0.02 | 1,660 | 3 |
| 19 | S | 0.04 | — | 1.31 | — | 0.10 | 0.02 | 2,520 | 4 |
| 20 | T | 0.04 | — | 1.31 | — | 0.10 | 0.02 | 3,200 | 4 |

Coating Applications

Table 7A and Table 7B list a grind formulation and a letdown formulation, respectively.

TABLE 7A

| Grind Formulation | | |
| --- | --- | --- |
| | | Amount |
| Generic Name/Trade Name | Lbs | Gal |
| Water | 151.20 | 18.15 |
| Nuosept ™ 498G | 0.21 | 0.13 |
| Ammonium Hydroxide (28%) | 1.50 | 0.17 |
| Tamol ™ 731A | 8.00 | 0.87 |
| Dextrol ™ OC-180 HS | 2.00 | 0.22 |
| Drewplus ™ T-4304 | 3.00 | 0.38 |
| Strodex ™ PK-95G | 2.00 | 0.22 |
| Ti-Pure ™ R-706 | 250.00 | 7.51 |
| Minex ® 7 | 15.00 | 0.69 |
| Min-U-gel ® 400 | 1.75 | 0.06 |

Nuosept ™ 498G: 1,2-benzisothiazolin-3-one, commercially available from Ashland Inc.

Tamol ™ 731A: Sodium salt of a maleic anhydride copolymer, commercially available from The Dow Chemical Company.

Dextrol ™ OC-180 HS: Neutralized (potassium salt) form of an ethoxylated aliphatic alcohol phosphate ester, commercially available from Ashland Inc.

Drewplus ™ T-4304: A defoamer, commercially available from Ashland Inc.

Strodex ™ PK-95G: Neutralized (potassium salt) form of a phosphate coester of aliphatic alcohols, commercially available from Ashland Inc.

Ti-Pure ™ R-706: Titanium dioxide, commercially available from Chemours Titanium Technologies.

Minex ® 7: Micronized functional filler having a median particle size of 3.5 microns, commercially available from The Cary Company.

Min-U-gel ® 400: A hydrous magnesium aluminum silicate, commercially available from Active Minerals International, LLC.

TABLE 7B

| Letdown Formulation | | |
| --- | --- | --- |
| | | Amount |
| Generic Name/Trade Name | Lbs | Gal |
| Rhoplex ™ VSR-1050 | 500.00 | 56.56 |
| Optifilm ™ Enhancer 400 | 8.00 | 0.99 |
| Drewplus ™ T-4304 | 2.00 | 0.25 |
| Polyphase ® 678 | 3.00 | 0.31 |

Rhoplex ™ VSR-1050: Acrylic emulsion, commercially available from The Dow Chemical Company.

Optifilm ™ Enhancer 400: a coalescent, commercially available from Eastman Chemical Company.

Polyphase ® 678: a fungicide, commercially available from Troy Corporation.

Thickening Efficiency Measurement

Thickening efficiency was measured by adding 5.3 g of water and 2.0 g of the aqueous polymer solutions listed in Table 5 into 66.4 g of the base paint obtained by mixing the formulations listed in Tables 7A and 7B. The thickening efficiency was measured by Brookfield Viscosity, Stormer Viscosity (KU) and ICI Viscosity as described below. The results are listed in Table 8.

Brookfield Viscosity was measured using a Brookfield viscometer with spindle #5 at 30 RPM and 25° C. It is expressed in mPa·s.

Stormer Viscosity was measured using a Stormer viscometer as per the standard test method ASTM D562. It is expressed in Kreb Units (KU).

ICI Viscosity was measured using an ICI cone and plate viscometer as per the standard test method ASTM D4287. It is expressed in mPa·s.

TABLE 8

| Thickening Efficiency of Aqueous Polymer Solutions | | | |
| --- | --- | --- | --- |
| Solution from Polymer | Brookfield Viscosity (mPa · s) | Stormer Viscosity (KU) | ICI Viscosity (mPa · s) |
| 1 | 12240 | 137 | 103.3 |
| 2 | 9933 | 130 | 143.1 |
| 3 | 4427 | 103 | 77.9 |
| 4 | 3080 | 95 | 65.8 |
| 5 | 9000 | 127 | 127.9 |
| 6 | 3880 | 101 | 74.8 |
| 7 | 5053 | 108 | 82.9 |
| 8 | 9693 | 131 | 134.8 |
| 9 | 3880 | 92 | 71.7 |
| 10 | 3547 | 96 | 151.0 |
| 11 | 1707 | 86 | 150.2 |
| 12 | 1387 | 78 | 12.4 |
| 13 | 347 | 52 | 48.1 |
| 14 | 787 | 68 | 93.3 |

Performance of Coatings

Aquaflow™ XLS 530 (a solvent free nonionic synthetic associative, commercially available from Ashland LLC.) and each aqueous polymer solution having 20 wt % solid polymers listed in Table 5 along with water were added into the letdown formulation in Table 7B. The coatings were then prepared by mixing the grind and the letdown formulations. The dosages of Aquaflow™ XLS 530, each aqueous polymer solution having 20 wt % solid polymers and water were adjusted to achieve a Stormer viscosity between 100 and 125 KU units and an ICI viscosity between 95 and 150 mPa·s for measuring the performance of the coatings described below. The results are listed in Table 9.

Sag Resistance was measured on a Leneta chart as per the standard test method ASTM D4400 using a mid-range bar. Wet film thickness (WFT) in mils above which sag occurs was measured.

Leveling was measured as per the standard test method ASTM D4062 on a scale of 0-10; 0=worst and 10=best.

Gloss was measured using a BYK Gardner Micro-Tri-Gloss meter as per ASTM D523. Gloss at 600 was reported.

Intrinsic Hide of the paints was recorded in terms of contrast ratio (CR) that was measured on a Leneta chart form #3B. Paint of 3 mil wet film thickness was applied on Leneta chart form #3B. Contrast ratio is the ratio of the reflectance of the surface of the dry paint film coated over a black substrate ($Y_b$) over a white substrate ($Y_w$). A higher contrast ratio indicates higher opacity and higher hiding power of paints.

TABLE 9

| Paint Application Properties | | | | |
| --- | --- | --- | --- | --- |
| Solution from Polymer | Sag | level | Gloss at 60° | Intrinsic hide |
| 1 | 24 | 2 | 42.6 | 0.977 |
| 2 | 24 | 3 | 43.2 | 0.971 |
| 3 | 24 | 5 | 43.9 | 0.980 |
| 4 | 18 | 9 | 45.2 | 0.981 |
| 5 | 24 | 4 | 42.7 | 0.979 |
| 6 | 24 | 4 | 43.7 | 0.986 |
| 7 | 24 | 4 | 44.6 | 0.980 |
| 8 | 24 | 3 | 51.9 | 0.975 |
| 9 | 24 | 5 | 44.2 | 0.981 |

TABLE 9-continued

| Paint Application Properties | | | | |
| --- | --- | --- | --- | --- |
| Solution from Polymer | Sag | level | Gloss at 60° | Intrinsic hide |
| 10 | 24 | 4 | 43.9 | 0.977 |
| 11 | 16 | 9 | 42.3 | 0.979 |
| 12 | 18 | 9 | 48.5 | 0.978 |
| 13 | 24 | 9 | 44.1 | 0.984 |
| 14 | 18 | 9 | 51.5 | 0.974 |

What is claimed is:

1. An aqueous protective coating composition, comprising:

a water-soluble or dispersible composition comprising a hydrophobically modified polyalkylene glycol having mono- and di-end capped hydrophobic groups, wherein the di-end capped hydrophobic groups are in a range of about 70% to about 98% by weight based on the total weight of the mono- and-di- end capped hydrophobic groups, wherein the polyalkylene glycol portion of the hydrophobically modified polyalkylene glycol is selected from the group consisting of polypropylene glycol, poly (ethylene glycol-propylene glycol), polybutylene glycol, polytetrahydrofuran, and combinations thereof;

wherein the di-end capped hydrophobic groups are selected from the groups consisting of substituted or unsubstituted moieties chosen from alkyl, alkenyl, aryl, alkylaryl, arylalkyl, arylalkenyl, cyclic, cycloaliphatic, and polycyclic groups, optionally having at least one heteroatom;

wherein an average weight molecular weight of the hydrophobically modified polyalkylene glycol is in a range of about 400 to 60,000 Daltons;

a latex polymer selected from the group consisting of a vinyl acetate ethylene polymer, an acrylic polymer, a vinyl-acrylic polymer, and a styrene-acrylic polymer; and at least one member selected from the group consisting of a pigment, a coalescent, a solvent, a wetting agent, a defoamer, a matting agent, a dispersant, a thickener, a biocide, a mildewcide, and a surfactant.

2. The aqueous protective coating composition of claim 1, wherein the alkyl group is linear or branched and comprises 4 to 24 carbon atoms.

3. The aqueous protective coating composition of claim 2, wherein the alkyl group comprises 6 to 20 carbon atoms.

4. The aqueous protective coating composition of claim 3, wherein the alkyl group comprises 8 to 16 carbon atoms.

5. The aqueous protective coating composition of claim 1, wherein the average weight molecular weight of the hydrophobically modified polyalkylene glycol is in a range of 1,000 to 50,000 Daltons.

6. The aqueous protective coating composition of claim 5, wherein the average weight molecular weight of the hydrophobically modified polyalkylene glycol is in a range of 3,000 to 35,000 Daltons.

7. The aqueous protective coating composition of claim 6, wherein the average weight molecular weight of the hydrophobically modified polyalkylene glycol is in a range of 6,000 to 30,000 Daltons.

8. The aqueous protective coating composition of claim 7, wherein the average weight molecular weight of the hydrophobically modified polyalkylene glycol is a range of 9,000 to 30,000 Daltons.

* * * * *